US008495075B2

(12) United States Patent
Miller

(10) Patent No.: US 8,495,075 B2
(45) Date of Patent: Jul. 23, 2013

(54) FUZZY STRING MATCHING OF MEDIA META-DATA

(75) Inventor: Mark Miller, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 11/372,253

(22) Filed: Mar. 8, 2006

(65) Prior Publication Data

US 2007/0214130 A1    Sep. 13, 2007

(51) Int. Cl.
*G06F 17/30* (2006.01)

(52) U.S. Cl.
USPC ............ 707/758; 707/999.006; 707/E17.039

(58) Field of Classification Search
None
See application file for complete search history.

(56) References Cited

U.S. PATENT DOCUMENTS

| | | | |
|---|---|---|---|
| 5,546,506 A * | 8/1996 | Araki et al. ..................... 706/61 |
| 5,925,843 A | 7/1999 | Miller et al. |
| 6,061,680 A * | 5/2000 | Scherf et al. ...................... 707/3 |
| 6,356,971 B1 * | 3/2002 | Katz et al. ...................... 710/301 |
| 6,701,312 B2 * | 3/2004 | Lau et al. ........................... 707/5 |
| 6,877,002 B2 * | 4/2005 | Prince ............................... 707/5 |
| 2002/0069195 A1 * | 6/2002 | Commons et al. ................ 707/3 |
| 2002/0099696 A1 * | 7/2002 | Prince ............................... 707/3 |
| 2003/0028796 A1 * | 2/2003 | Roberts et al. ................. 713/193 |
| 2003/0079038 A1 | 4/2003 | Robbin et al. |
| 2003/0086341 A1 * | 5/2003 | Wells et al. ................. 369/13.56 |
| 2003/0112729 A1 * | 6/2003 | Nichols et al. ............. 369/53.22 |
| 2003/0167318 A1 | 9/2003 | Robbin et al. |
| 2004/0034441 A1 * | 2/2004 | Eaton et al. ...................... 700/94 |
| 2004/0034650 A1 * | 2/2004 | Springer et al. .............. 707/102 |
| 2005/0015712 A1 * | 1/2005 | Plastina et al. ............. 715/500.1 |
| 2005/0015713 A1 * | 1/2005 | Plastina et al. ............. 715/500.1 |
| 2005/0027689 A1 * | 2/2005 | Bogdanov ......................... 707/3 |
| 2005/0055372 A1 * | 3/2005 | Springer et al. ............. 707/104.1 |
| 2006/0106867 A1 * | 5/2006 | Burges et al. .............. 707/104.1 |
| 2006/0195521 A1 * | 8/2006 | New et al. ..................... 709/204 |

OTHER PUBLICATIONS

"Allmusic", www.allmusic.com, downloaded Jun. 14, 2007, pp. 1-2.
"Fuzzy Logic", www.webopedia.com/TERM/f/fuzzy_logic.html, downloaded Jun. 14, 2007, pp. 1-3.

* cited by examiner

*Primary Examiner* — Anteneh Girma
(74) *Attorney, Agent, or Firm* — Blakely, Sokoloff, Taylor & Zafman LLP

(57) ABSTRACT

A method accomplishes matching a particular media metadata record to one of a plurality of records of a first media metadata database. For the particular media metadata record, for each of at least some of the tokens of the particular media metadata record, a table is processed that correlates that token to records of the first media metadata database. Based on the processing, it is determined in which of the plurality of records (match candidate records) of the first media metadata database that token of the particular record appears. For each of at least some of the match candidate records of the first media metadata database, a value is determined that indicates a degree of match between that match candidate record and the particular media metadata record. The determined values are processed to determine one of the match candidate records is a nominal match to the particular media metadata record.

15 Claims, 4 Drawing Sheets

First media metadata database 106

Record 108a
Record 108b
Record 108c
Record 108n

Second media metadata database 102

Record 104

Record 108

|         | 252-1 | 252-2 | 252-3    |                |
|---------|-------|-------|----------|----------------|
| Under   | My    | Thumb |          | 252 (title)    |
| Mick    | Jagger| Keith | Richards | 254 (composer) |
| The     | Rooling| Stones |         | 256 (performer)|
| 9999999999 |    |       |          | 258 (UPC)      |

*Fig. 2*

| | 202 (252-1) | 206 (252-1) | 207 (252-1) |
|---|---|---|---|
| 203a | The | 12345 | |
| 203b | Rooling | 12345 | |
| 203c | Stones | 12345 | |
| 203d | The Rooling Stones | 12345 | |
| | | | |
| | | | |
| | Tokens from records of first database 106 | ID's of records in first database 106 | Popularity |

FUZZY STRING MATCHING OF MEDIA META-DATA

BACKGROUND OF THE INVENTION

Databases of media metadata are known. One such database is provided by All Media Guide of Ann Arbor, Mich. Such databases are available for access over the internet, for example, to populate records for media contained in a media library of a client computer. In fact, there are a number of such databases, available for access over the internet and otherwise.

SUMMARY OF THE INVENTION

The invention is, in one aspect, a method of matching a particular media metadata record to one of a plurality of records of a first media metadata database. For the particular media metadata record, for each of at least some of the tokens of the particular media metadata record, a table is processed that correlates that token to records of the first media metadata database. Based on the processing, it is determined in which of the plurality of records of the first media metadata database that token of the particular record appears. The determined records are match candidate records of the first media metadata database.

For each of at least some of the match candidate records of the first media metadata database, a value is determined for each match candidate record that indicates a degree of match between that match candidate record and the particular media metadata record. The determined values are processed to determine one of the match candidate records is a nominal match to the particular media metadata record.

In one example, the table that correlates tokens to records of the first media metadata database is generated by processing the plurality of records of the first media metadata database to correlate, to each of at least a subset of the tokens appearing in the metadata of the first media metadata database, the records in which that token appears.

BRIEF DESCRIPTION OF THE DRAWINGS

FIG. 2 illustrates an example of a record in the first media metadata database.

FIG. 3 illustrates a simplistic example of a table that may be used to hold mapping results.

DETAILED DESCRIPTION OF THE PREFERRED EMBODIMENTS

It is desirable to be able to match records of a media metadata database to records of other media metadata databases. For example, one database may have types of metadata (and/or other content) not available in another database. However, it can be difficult to match records (i.e., determine that a particular record in one database corresponds to a particular record in another database), given differences in how the metadata is represented. These differences may be intentional or, in some cases, unintentional (e.g., due to misspellings).

In this description, the term "database" is not meant to imply any particular structure or method of access. Rather, the term "database" is used expansively to broadly indicate a collection of data organized in some systematic manner. For example, the database may be merely organized as a table, or even some simpler structure, or the database may be as complex as a relational database or some other complex structure. Typically, the database is computer accessible and the methods described herein are computer-implemented methods.

Figure 1:
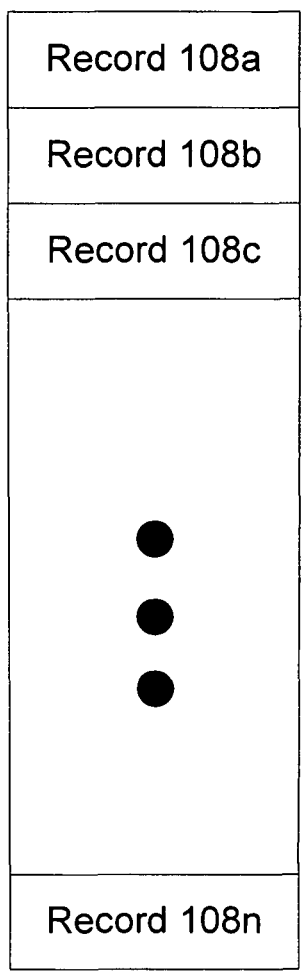
FIG. 1 schematically illustrates two media metadata databases.
Figure 1:
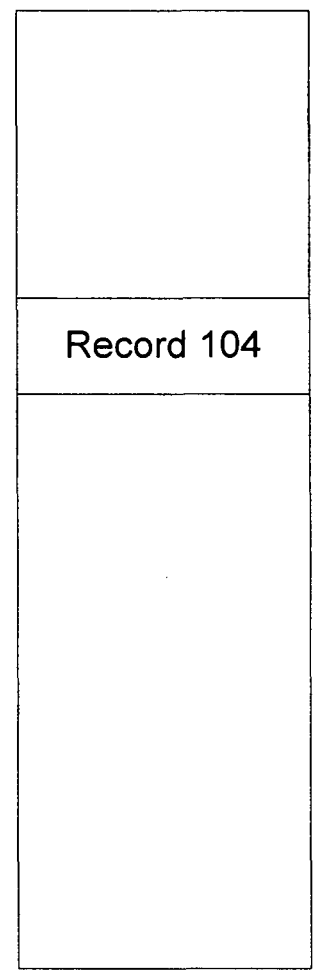

FIG. 1 schematically illustrates two media metadata databases—a first media metadata database 106 and a second media metadata database 102. The first media metadata database 106 includes a plurality of records 108a, 108b, etc. up to 108n. A typical such media metadata database may have millions of records. The second media metadata database 102 also includes a plurality of records, one of which is record 104.

FIG. 2 illustrates an example of a record 108 in the first media metadata database 106. By way of example, and not by way of limitation, the example record 108 is for holding metadata regarding a song. The record 108 includes, for example, a title field 252, a composer field 254, a performer field 256 and a Universal Product Code field 258. The entire contents of each field may be considered a token and, in addition, portions of each field may each themselves be considered a token. For example, taking the field 252 in FIG. 2, the following may be tokens corresponding to the field 252: "Under My Thumb" 252; "Under" 252-1; "My" 252-2; and "Thumb" 252-3. While FIG. 2 illustrates a record 108 in the first media metadata database 106, records 104 in the second media metadata database 102 are generally similar in structure to the records 108 in the first media metadata database 106.

In one possible approach (not the invention) for matching the records 104 of the second media metadata database 102 to the records 108 of the first media metadata database 106, each of one or more records 104 of the second media metadata database 102 is considered in turn. Specifically, the metadata in each record 104 of the second media metadata database 102 is, in turn, compared to metadata in each record 108 of the first media metadata database 106. Realizing that an exact match might not be found, a "fuzzy" match may be attempted, in an attempt to match words or other data that are similar, but not identical. However, fuzzy matches are expensive to compute for a single record, let alone for a number of records on the order of a million in each database to be matched.

Figure 4:
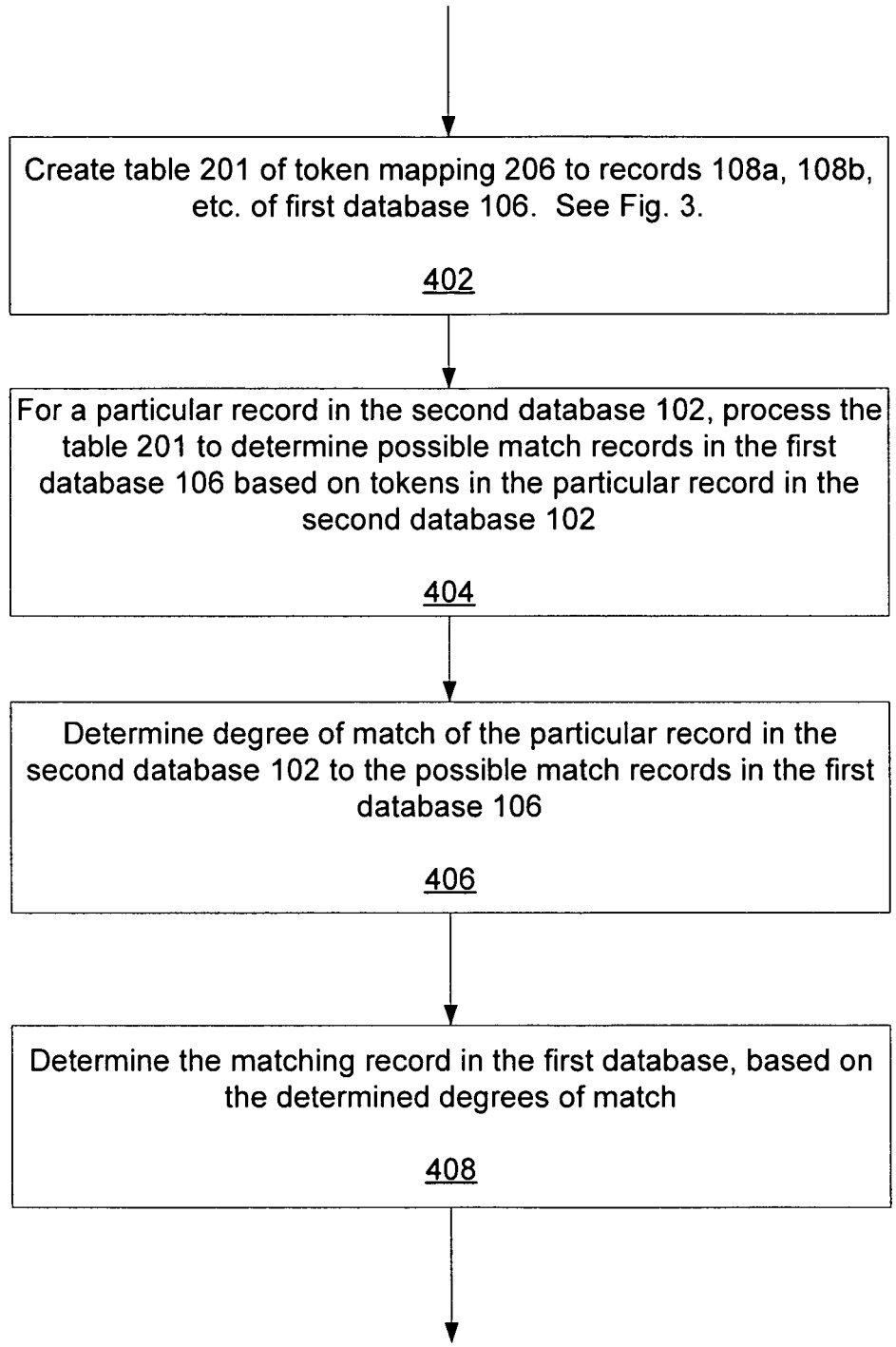
FIG. 4 is a flowchart illustrating a methodology for matching a particular record in the second media metadata database to a one of the records of the first media metadata database.

We now discuss an example aspect of the invention, broadly speaking, with reference to FIGS. 3 and 4, and also with reference to FIGS. 1 and 2 that have already been discussed. Referring to FIG. 4, at step 402, the first media metadata database (such as the first media metadata database 106) is processed (e.g., preprocessed) to create a mapping of tokens (such as tokens that are an entire field, such as the title field 252 and/or tokens that are part of a field, such as tokens 252-1, 252-2 and 252-3) occurring in the records 108 of the first media metadata database 106 to those records 108 of the first media metadata database 106 in which those tokens occur.

FIG. 3 illustrates a simplistic example of a table 201 that may be used to hold the results of the step 402 mapping, using the example of the first media metadata database 106. Rows 203a, 203b, 203c, etc. of the table 201 correspond to each token processed from the records 108a, 108b, etc. of the first media metadata database 106. The column 202 of a particular row (203, generically) holds an indication of the token processed. The column 206 holds one or more identifiers of records 108 in the first media metadata database 106 in which the token is found to appear. Thus, for each record of the first media metadata database 106 processed, if a particular token for a row 203 in the table 201 appears in that record 108, the identifier of that record 108 is added to the column 206 of the row 203 for that token. If a particular token appears in that record 108 but does not yet have a row 203 in the table, then a row 203 is created in the table 203 for the particular token, with the identifier for the record 108, in which the particular token appears, in the column 206 of the row 203 for the particular token.

The column 207 indicates the "popularity" of the token for the row 203. Each time the token for the row 203 appears, the popularity value in column 207 for that row 203 is incremented. One use for the popularity value is discussed later.

Thus, in one example, after processing the record 108 according to step 402 of the FIG. 4 flowchart, the column 202 of the table 201 would include the tokens "Under My Thumb"; "Under"; "My"; "Thumb"; "Mick Jagger"; "Mick"; "Jagger"; "Keith Richards"; "Keith"; "Richards"; "The Rolling Stones"; "The"; "Rolling"; "Stones"; and "9999999999". For simplicity of example, the FIG. 3 table includes only the tokens "The" (row 203a), "Rolling" (row 203b), "Stones" (row 203c), and "The Rolling Stones" (row 203d). If, for example, a word is misspelled, the token would also be misspelled. For example, "Rooling" (a misspelling of "Rolling") would have a separate entry in the column 202 from "Rolling." Assuming a record identifier of the record 108 (FIG. 2) is "12345," the corresponding entries in the column 206 would all include the value "12345."

Furthermore, at each processing of a particular token (i.e., each time a particular token is found in a different record 108 of the first media metadata database 106), a record identification of the record, of the first media metadata database 106, in which the token is found is added to the appropriate entry (i.e., in the row 203 for that token) in the column 206 of the table 201. Thus, after processing multiple records of the first media metadata database 106, the rows of the table 201 each include a token (column 202), a list of record identifiers of records in which that token was found (column 204). Furthermore, the entry for a row in the column 206 includes a popularity value that is an indication of the total number of records in which the token corresponding to that was found.

Referring again to FIG. 3, processing in step 404 is to determine which records 108 of the first media metadata database 106 are a potential match to a particular record 104 in the second media metadata database 102. More specifically, for each of at least some of the tokens in the particular record 104 in the second media metadata database 102, that token is matched to a row 203 in the table 201 having that token in the tokens column 202. The records of the first media metadata database, identified by the row identifiers in column 206 of the row 203 to which a token of the particular record 104 is matched, are records that are treated as possible records matching the particular record 104 of the second media metadata database 102 (i.e., match candidate records).

At step 406 of the method represented in the FIG. 3 flowchart, for each of at least some of the match candidate records (e.g., some may be eliminated based on particular criteria, examples of which are discussed later), a determination is made of a degree of match between the particular record in the second media metadata database and that match candidate record. For example, the determination of a degree of match for each match candidate record may be determined by applying a fuzzy match algorithm to a constructed string, constructed of, for example, the artist field and title fields of an album metadata record. That is, the string is constructed for both the particular record in the second media metadata database and for each match candidate record. The thus-determined degrees of match between the particular record in the second media metadata database and each match candidate record are then processed to determine which match candidate record is the best match to the particular record in the second media metadata database.

In one example, the fuzzy match between the two strings is calculated by taking the edit distance (also known as the Levenshtein distance) of the two strings (edit distance being basically the minimum number of letters needed to change one string into the other string) divided by the length of the shorter of the two strings. For example, the edit distance between "The Rolling Stones" and "Rooling Stones" is five: four to delete "The" and one to change the "l" to an "o". The fuzzy match score would thus be 5/14 letters=0.36. In addition, if the UPC tokens match as well, 0.25 is deducted from the score (making −0.25 a perfect score).

Thus, prior to step 408, a degree of match has been determined between the particular record in the second media metadata database 102 and each of the match candidate records 108 in the first media metadata database 106. At step 408, based on the degrees of match determined in step 406, one (or, perhaps none) of the match candidate records of the first media metadata database 106 is determined to match the particular record of the second media metadata database 102.

It is possible that even the match candidate record exhibiting the best match score relative to the particular record in the second media metadata database is not determined to match the particular record. In one example, the range −0.25 to 0.25 fuzzy score is considered to be a strong match, 0.25 to 0.50 is considered to be a weak match, and anything above 0.50 is considered to be a non-match. Using these ranges, if the best match score is, for example, greater than 0.50, it is considered that none of the match candidate records match the particular record.

The "popularity" value for a token has been mentioned above. In one example, when the popularity value of a token becomes above a particular threshold, then that token is no longer considered in determining match candidate records. In this way, a token that does not serve to distinguish a particular record, because the token is so popular anyway, is merely ignored. (An example of such a token may be "The," which appears in the title of many songs.) Additionally, since the token is ignored, then the media identifiers corresponding to that token need not be maintained. In one example, the popularity value continues to be maintained even though the token to which the popularity value corresponds does not contribute to determining match candidate records.

Further, in one example implementation, the record identifier (e.g., in column 206 of the FIG. 3 table 201) are mapped to the content of particular media metadata records by a mapping function, such as a hash function. In another example, the record information for the match candidate records (i.e., the metadata fields of the match candidate records) is provided directly into the FIG. 3 table. However, providing the record information directly into the table uses relatively much more memory than a mapping implementation, since all the record information would be nominally duplicated in the table 201 for each token that appears in the record.

In summary, then, in accordance with a broad aspect, the first media metadata database (to which the records of a second media metadata database are to be matched) is "preprocessed" such that tokens of the records of the first media metadata database are matched to record identifiers of records in which those tokens appear. To match a particular record of the second media metadata database, the tokens of that particular record are located in the table. Match candidate records in the first media metadata database include those records of the first media metadata database in which the tokens of the particular record appear. The match candidate record exhibiting the best match, if any, to the particular record is deemed to be the matching record.

While this invention has been described in terms of several embodiments, there are alterations, permutations, and equivalents, which fall within the scope of this invention. For example, the databases whose records are being matched need not be limited to databases of media metadata. Furthermore, it should also be noted that there are many alternative ways of implementing the methods and apparatuses of the present invention. It is therefore intended that the following appended claims be interpreted as including all such alterations, permutations, and equivalents as fall within the true spirit and scope of the present invention

What is claimed is:

1. A computer-implemented method, comprising:
    processing a first media metadata database to generate a plurality of tokens, wherein the first media metadata database includes a plurality of records, each record corresponds to a different media item and includes a plurality of metadata fields, and each token is mapped to a record from which the token is generated;
    matching one or more tokens of a particular record of a second media metadata database to a plurality of the generated tokens from the first media metadata database, the second media metadata database including one or more records including the particular record, the particular record corresponding to a media item and including a metadata field, and the matching tokens mapped to a plurality of candidate records of the first media metadata database;
    constructing a string from a plurality of tokens of the particular record of the second media metadata database;
    constructing, for each candidate record, a string from a plurality of tokens of the candidate record;
    determining a degree of match between the constructed string for the particular record of the second media metadata database and each constructed string from the candidate records; and
    selecting a candidate record of the first media metadata database as a match for the particular record of the second media metadata database based upon the determined degrees of match.

2. The computer-implemented method of claim 1, wherein the processing includes generating a plurality of tokens from a first metadata field of a first candidate record, and wherein the constructed string for the first candidate record includes the plurality of tokens from the first metadata field.

3. The computer-implemented method of claim 1, further comprising:
    maintaining a popularity value for each the generated tokens from the first media metadata database; and
    determining that one of the candidate records is not a candidate based upon the popularity value for the one candidate record being above a threshold.

4. The computer-implemented method of claim 3, wherein the popularity value represents a number of occurrences of a token in different records.

5. The computer-implemented method of claim 1, wherein the constructed strings include tokens from a plurality of the metadata fields.

6. A non-transitory computer-readable medium storing instructions, which when executed by a processing device, cause the processing device to perform method comprising:
    processing a first media metadata database to generate a plurality of tokens, wherein the first media metadata database includes a plurality of records, each record corresponds to a different media item and includes a plurality of metadata fields, and each token is mapped to a record from which the token is generated;
    matching one or more tokens of a particular record of a second media metadata database to a plurality of the generated tokens from the first media metadata database, the second media metadata database including one or more records including the particular record, the particular record corresponding to a media item and including a metadata field, and the matching tokens mapped to a plurality of candidate records of the first media metadata database;
    constructing a string from a plurality of tokens of the particular record of the second media metadata database;
    constructing, for each candidate record, a string from a plurality of tokens of the candidate record;
    determining a degree of match between the constructed string for the particular record of the second media metadata database and each constructed string from the candidate records; and
    selecting a candidate record of the first media metadata database as a match for the particular record of the second media metadata database based upon the determined degrees of match.

7. The non-transitory computer-readable medium of claim 6, wherein the processing includes generating a plurality of tokens from a first metadata field of a first candidate record, and wherein the constructed string for the first candidate record includes the plurality of tokens from the first metadata field.

8. The non-transitory computer-readable medium of claim 6, the method further comprising:
    maintaining a popularity value for each the generated tokens from the first media metadata database; and
    determining that one of the candidate records is not a candidate based upon the popularity value for the one candidate record being above a threshold.

9. The non-transitory computer-readable medium of claim 8, wherein the popularity value represents a number of occurrences of a token in different records.

10. The non-transitory computer-readable medium of claim 6, wherein the constructed strings include tokens from a plurality of the metadata fields.

11. An apparatus, comprising:
    a processing device, wherein the processing device executes instructions that cause the apparatus to:
        process a first media metadata database to generate a plurality of tokens, wherein the first media metadata database includes a plurality of records, each record corresponds to a different media item and includes a plurality of metadata fields, and each token is mapped to a record from which the token is generated;
        match one or more tokens of a particular record of a second media metadata database to a plurality of the generated tokens from the first media metadata database, the second media metadata database including one or more records including the particular record, the particular record corresponding to a media item and including a metadata field, and the matching tokens mapped to a plurality of candidate records of the first media metadata database;
        construct a string from a plurality of tokens of the particular record of the second media metadata database;
        construct, for each candidate record, a string from a plurality of tokens of the candidate record;

determine a degree of match between the constructed string for the particular record of the second media metadata database and each constructed string from the candidate records; and select a candidate record of the first media metadata database as a match for the particular record of the second media metadata database based upon the determined degrees of match.

12. The apparatus of claim 11, wherein the processing includes generating a plurality of tokens from a first metadata field of a first candidate record, and wherein the constructed string for the first candidate record includes the plurality of tokens from the first metadata field.

13. The apparatus of claim 11, wherein the processing device further causes the apparatus to:

maintain a popularity value for each the generated tokens from the first media metadata database; and determine that one of the candidate records is not a candidate based upon the popularity value for the one candidate record being above a threshold.

14. The apparatus of claim 13, wherein the popularity value represents a number of occurrences of a token in different records.

15. The apparatus of claim 11, wherein the constructed strings include tokens from a plurality of the metadata fields.

* * * * *